United States Patent
Gazounaud et al.

(10) Patent No.: US 6,694,432 B1
(45) Date of Patent: Feb. 17, 2004

(54) SECURING DATA IN A MACHINE FOR TESTING ELECTRONIC COMPONENTS

(75) Inventors: Yann Gazounaud, Saint Just Saint Rambert (FR); Max Wach, Saint Etienne (FR)

(73) Assignee: Schlumberger Systémes, Montrouge Cedex (FR)

( * ) Notice: Subject to any disclaimer, the term of this patent is extended or adjusted under 35 U.S.C. 154(b) by 0 days.

(21) Appl. No.: 09/350,611

(22) Filed: Jul. 9, 1999

(30) Foreign Application Priority Data

Jul. 9, 1998 (FR) .............................. 98 08846

(51) Int. Cl.[7] ................................................ H04L 9/00
(52) U.S. Cl. ...................................... 713/165; 713/162
(58) Field of Search .............................. 713/165, 166, 713/164, 162

(56) References Cited

U.S. PATENT DOCUMENTS 4,864,494 A * 9/1989 Kobus, Jr. .................. 713/200
5,553,144 A 9/1996 Almquist et al. ............. 380/25
6,473,861 B1 * 10/2002 Stokes ......................... 713/193

* cited by examiner

*Primary Examiner*—Norman M. Wright
(74) *Attorney, Agent, or Firm*—Cohen, Pontani, Lieberman & Pavane

(57) ABSTRACT

Securing data stored in an electronic component test machine which includes a central processor unit provided with storage means, and a local memory connected to the storage means via a transmission bus. At least one file of test vectors is created to perform the component test. Data contained in the file of test vectors is encrypted. The encrypted test vector file is stored in the storage means of the central processor unit. Prior to each test, the encrypted test vector file is loaded into the local memory via the transmission bus, and then the encrypted data of the test vector files is decrypted and stored in the local memory from where it is retrieved so that the test can be performed. While unencrypted data is stored in the local memory component, access to it by the operator is blocked so that sensitive information contained therein remains secure.

8 Claims, 2 Drawing Sheets

SECURING DATA IN A MACHINE FOR TESTING ELECTRONIC COMPONENTS

FIELD OF THE INVENTION

The invention involves testing electronic components and, in particular, to securing data in a machine for testing electronic components.

BACKGROUND OF THE INVENTION

In general, a machine for testing electronic components includes the following three parts:

(1) a central processor unit (CPU) provided with storage means such as a hard disk, in which at least one file for the test to be performed is stored. The CPU constitutes a computer enabling an operator to start the test, to monitor certain parameters while the test is running, and to retrieve data at the end of the test. Test files include a truth table in which each column corresponds to one of the pins of a component under test and in which each line, also referred to as a "vector", defines a configuration of logical 0 or 1 signals which are either stimuli to apply to certain pins, or the responses expected from stimuli applied to other pins;

(2) an electronic test unit connected to the CPU via a tester interface situated between the bus of the CPU and a transmission bus of the electronic test unit, and over which test vector files are transferred prior to execution from the hard disk of the CPU to the local memory of the electronic test unit. This operation of transferring test vector files is necessary because a test performed directly from the files stored on the hard disk would take far too long, given the time required to read the hard disk and the time required for transmitting the test vector files through the tester interface from the hard disk to the electronic test unit. The electronic test unit also has a timing generator for supplying testing events organized in a temporal sequence. A formatter serves to organize the vectors of the truth table in the time sequence received from the timing generator so as to constitute a set of logic signals complying with the successive operations that are to be performed during the test; and (3) a test head in which the electronic components that are to be tested are placed, and having an electronic link whose function is to put into analog form the logical stimuli as a function of the technology and the logic used by the components, and conversely, to put into logic form the responses of the components to the applied stimuli.

At present, test vector files are stored in unencrypted form on the hard disk of the CPU. The contents thereof, and in particular the test vectors, can thus easily be accessed from the CPU of the test machine and can be copied onto any medium, and in particular onto a floppy disk. In addition, the operation of the test machine includes a debug mode for reading or modifying the local memory after it has been loaded. In this particular mode, it is thus also possible to access the files loaded into the local memory, and thus to access the test vectors.

Unfortunately, test vectors may contain sensitive data, for example, the codes of bank cards, the on-board software, e.g. game software protected by copyright, or indeed passwords giving access to components for reading installed software that is under test.

SUMMARY OF THE INVENTION

An object of the present invention is to secure data which is stored in an electronic component test machine having a CPU provided with storage means and a local memory connected to the storage means via a transmission bus.

Another object of the invention is to limit and control access to the test vector files during the various stages of a test.

These and other objects are accomplished in accordance with one aspect of the invention which is directed to a method which utilizes at least one file of test vectors. Data contained in the file of test vectors is encrypted by encrypting-decrypting means, and the encrypted test vector file is stored in the storage means of the central processor unit. Prior to each test, the encrypted test vector file is loaded into the local memory via the transmission bus. The encrypted data of the test vector file is decrypted, and the component test is performed therewith.

Thus, the invention makes it possible to prevent access to sensitive data while the test vector file is installed in the storage means, and in particular the hard disk of the CPU.

Another aspect of the invention is directed to an apparatus for securing data in an electronic component test machine which includes a central processor unit provided with storage means. A local memory is connected to the storage means via a transmission bus. The apparatus includes a means for providing at least one file of test vectors, means for encrypting data contained in the file of test vectors, means for storing the encrypted test vector file in the storage means of the central processor unit, means for loading the encrypted test vector file into the local memory via the transmission bus prior to each test, means for decrypting the encrypted data of the test vector file, and means for performing the test with the test vector file outputted by the decrypting means.

Still another aspect of the invention is directed to an apparatus for securing a file of test vectors utilized in an electronic component test machine having (i) a central processing unit with a storage memory storing an encrypted file of test vectors, (ii) a local memory coupled to the storage memory, and (iii) a component test unit coupled to an output of the local memory for performing a component test. The apparatus includes a decrypting device and a communication bus coupling the storage memory to the local memory and coupling the decrypting device to the local memory. A security interface controls communication on the bus between the decrypting device and the local memory to enable decryption of an encrypted file of test vectors previously loaded into the local memory from the storage memory and then storing the resulting unencrypted file in the local memory. The security interface blocks access to the local memory by the central processing unit while the local memory contains an unencrypted file of test vectors.

In accordance with a specific feature of the invention, it is possible, even after the test vector file has been loaded, to access the local memory and thus the non-encrypted sensitive data, by using the debug mode which is intended to enable an operator to take action if errors appear while a test is being executed. The invention normally prevents a read or modify access to the local memory after the encrypted data of the test vector file is decrypted. Nevertheless, if it is desired to enable an operator to read or modify the local memory for debug purposes, e.g. while developing the program or while looking for a problem in a test, it is advantageous to authorize such access to the local memory for reading or modification purposes, and this is accomplished by presenting an access authorization.

In a particular embodiment of the invention, the encryption-decryption is performed by an encrypting-decrypting means which is an electronic chip card containing a secret key and an encrypting-decrypting algorithm. The level of security obtained in this way is very high since, firstly, the secret key embedded in the memory of the card can be discovered neither by the person who encrypted the sensitive data nor by the operator and, secondly, it is never transmitted to the test machine since it is the card which does its own decrypting.

Similarly, provision can be made for the access authorization to be contained in an electronic chip card which is, in general, different from the encrypting-decrypting card, but that is provided with all of the access privileges needed for a debug mode.

DETAILED DESCRIPTION OF THE INVENTION

Figure 1:
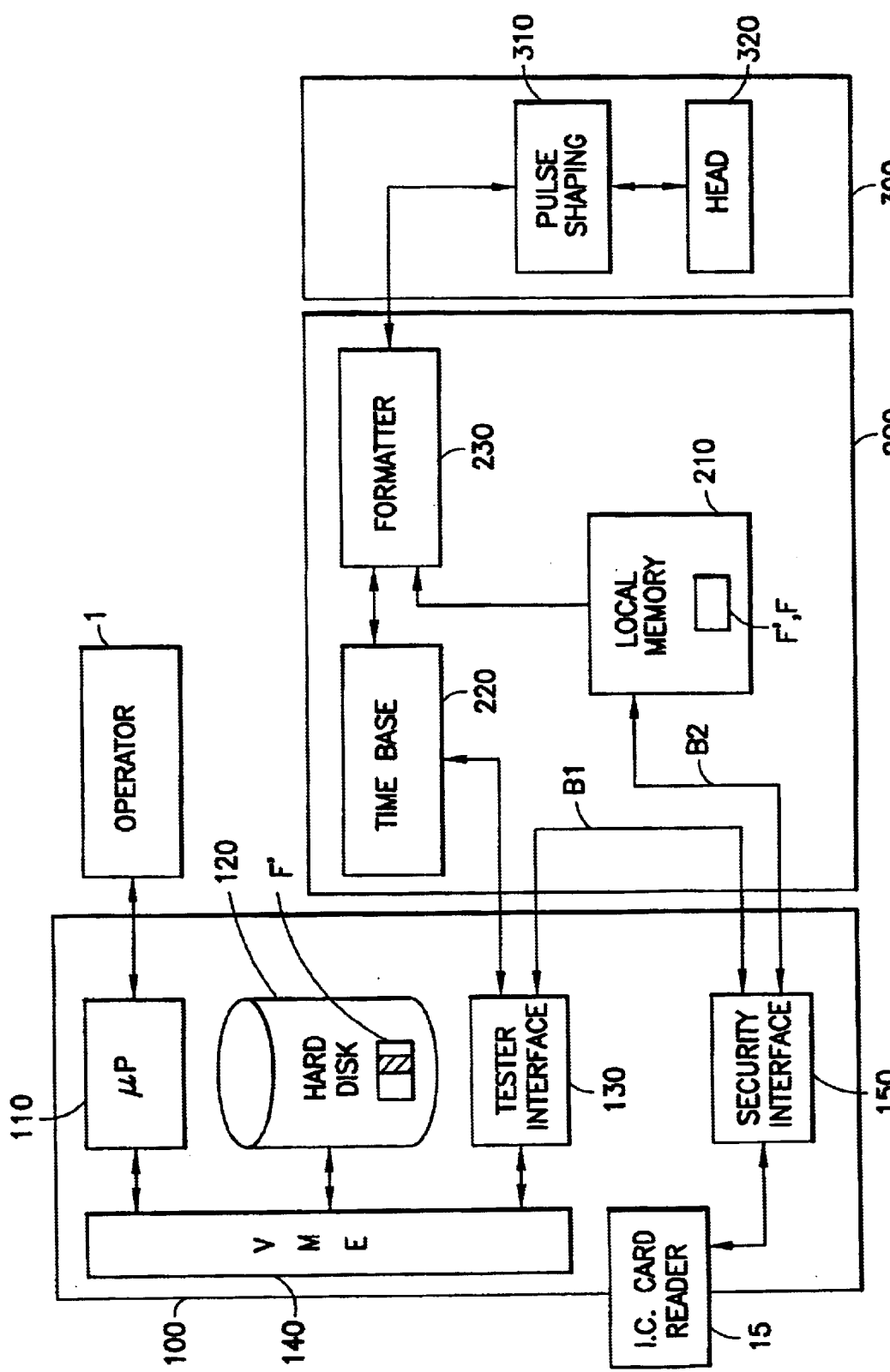
FIG. 1 is a block diagram of a test machine suitable for implementing the security method of the invention.

FIG. 1 is a block diagram showing the various parts of a components test machine as described above. Central processor unit (CPU) 100 is under the control of an operator 1 using a keyboard and a screen, and comprises a microprocessor 110 together with storage means 120, in this case a hard disk, designed to store the file(s) containing the test vectors grouped together in a truth table. To designate a test vector file, the letter F is used to designate an unencrypted file, or the letter F' is used to designate an encrypted file. As shown in FIG. 1, the hard disk 120 is designed to store test vector files in encrypted form.

The CPU 100 also has a reader device 15 for reading electronic chip cards and a security interface 150 whose functions are described below.

A bus 140 of the CPU 100 serves to provide communication between the microprocessor 110, the hard disk 120, and a tester interface 130. Interface 130 provides access to an electronic test unit 200 which performs all of the test operations on the electronic components that are placed on the test head 320 of head unit 300 of the machine. Bus 140 is preferably the well known and widely used VME (VersaModule Eurocard) bus.

The electronic test unit 200 has a local memory 210 connected to the test interface 130 of the CPU 100 via a bus having bus sections B1, B2. Communication between bus sections B1 and B2 is provided via the security interface 150. The local memory 210 receives test files from the hard disk 120 via tester interface 130. Vectors are then created by a formatter 230 from the test files stored in local memory 210 to constitute a string of logic signals sequenced by a timing generator 220, said logic signals then being converted into appropriate signals by an electronic pulse-shaping circuit 310 included in the head unit 300, the components to be tested (not shown) being placed on the test head 320.

Figure 2:
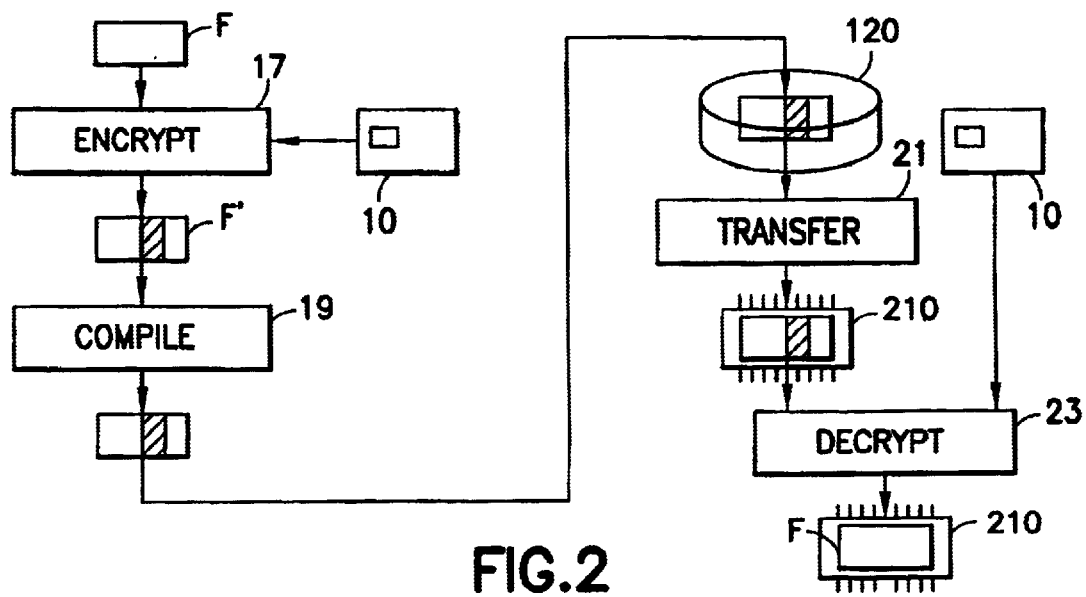
FIG. 2 is a block diagram showing the various steps of the security method of the invention.
Figure 3:
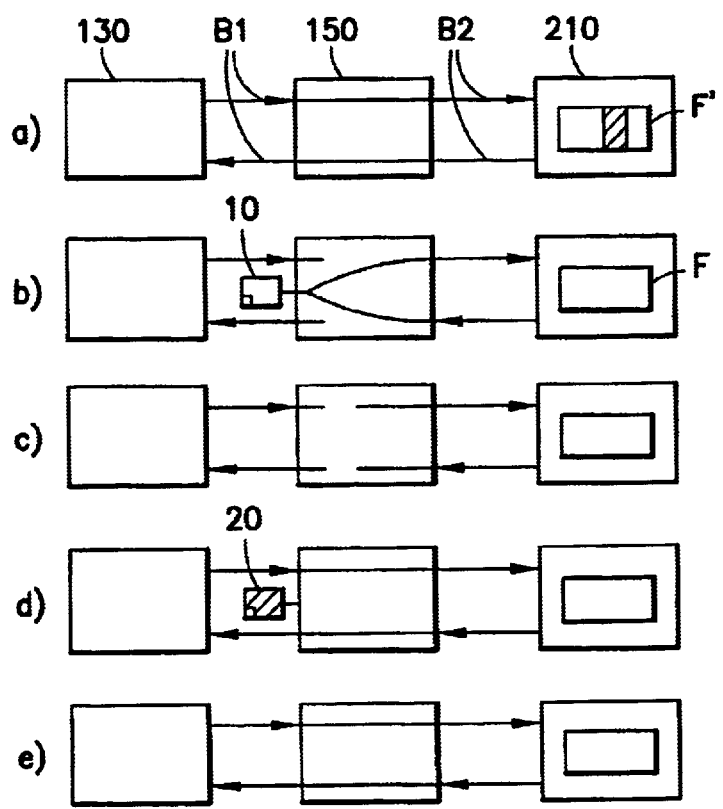
FIGS. 3a) to 3e) are block diagrams showing the successive functions of the security interface of the test machine of FIG. 1.

In order to secure sensitive data contained in the vectors of the test file, the operation of the invention is as described below with reference to FIGS. 1, 2, and 3.

Once at least one file F of unencrypted test vectors has been created (FIG. 2), the file is encrypted, if it contains sensitive information, by encrypt operation 17 performed with encrypting-decrypting means which, in the embodiment described, are constituted by an electronic chip card 10 containing a secret key and an encrypting-decrypting algorithm. The encrypt operation can be performed on the test machine itself by first storing the unencrypted files on hard disk 120, then encrypting by using card 10 inserted in card reader 15, as shown in FIG. 1, and then storing the encrypted files on hard disk 120. Encryption can also be performed somewhere else in a secure location and by a trustworthy person, with the encrypted file F' then being delivered to the test machine, together with the encrypting-decrypting card 10, and stored on hard disk 120.

In general, encryption of the test vector files will be partial in that only those files which contain sensitive data that is to be protected will be encrypted. In FIGS. 2 and 3, this sensitive data is represented by the darkened area in the file F'.

After a compile operation 19, the encrypted file F' is stored on the hard disk 120 of the test machine. The sensitive data is then inaccessible, in particular to the operator 1.

When the component testing is to be performed, and for the reasons explained above, the encrypted file F' of the test vectors is transferred unchanged from the hard disk 120 to the local memory 210 via the bus sections B1, B2 by transfer operation 21. This operation corresponds to state a) in FIG. 3, and during this operation the security interface 150 provides a completed path between the bus sections B1 and B2 of the bus.

Thereafter, in order to be able to perform the test, the encrypted file F' is decrypted by decrypt operation 23 performed in the electronic encrypting-decrypting chip card 10 inserted in the reader 15 of the test machine in association with the security interface 150, and it is delivered to the local memory 210. During this decrypt operation 23, as represented by state b) of FIG. 3, only the bus section B2 is kept active, under the control of the security interface 150.

After the decrypt operation 23 is completed, an acknowledge message is issued to the CPU 100 for verification purposes, as is well known, in the sense that the acknowledgment received must correspond to the proper encrypting-decrypting card 10 and the decrypted file must be the proper file. How this is done is conventional and well known so that no details thereof are deemed necessary Thereafter, once the test vectors have been stored in local memory 210, and as represented by state c) in FIG. 3, the security interface 150 prevents any access to the local memory 210 for reading or modification purposes (debug mode). However, if it is necessary for the operator 1 to take action because of some anomaly in the running of the test, access to debug mode can be obtained to read or modify the local memory 210 by presenting access authorization, e.g. as contained in an electronic chip card 20 inserted in the reader of the test machine, as shown in state d) of FIG. 3.

At the end of the test, the security interface 150 reestablishes communication over the bus sections B1, B2, but only after it has emptied the local memory 210 of the file F of unencrypted test vectors.

We claim:

1. A method of securing data in an electronic component test machine comprising a central processor unit provided with storage means and a local memory connected to said storage means via a transmission bus, the method comprising the steps of:
   a) providing at least one file of test vectors;
   b) encrypting data contained in the file of test vectors;
   c) storing the encrypted test vectors file in the storage means of the central processor unit;
   d) prior to each test, loading the encrypted test vectors file into said local memory via the transmission bus, said test vectors file being transferred unchanged from the storage means to the local memory;
   e) decrypting the encrypted data of the test vectors file which is in the local memory to provide a corresponding decrypted test vectors file; and
   f) performing the test with said decrypted test vectors file.

2. A method according to claim 1, wherein said encrypting-decrypting are performed by an electronic chip card containing a secret key and an encrypting-decrypting algorithm.

3. A method according to claim 1, wherein, after sensitive data has been decrypted, an acknowledge message is sent to the central processor unit for verification.

4. A method according to claim 1, wherein, after step e), access to the local memory for reading or modification purposes is prevented.

5. A method according to claim 4, wherein access to the local memory for reading or modification purposes is authorized on presentation of an access authorization.

6. A method according to claim 5, wherein said access authorization is contained in an electronic chip card.

7. An apparatus for securing data in an electronic component test machine which includes a central processor unit provided with storage means and a local memory connected to said storage means via a transmission bus, the apparatus comprising:

means for providing at least one file of test vectors;

means for encrypting data contained in the file of test vectors;

means for storing the encrypted test vectors file in the storage means of the central processor unit;

means for loading the encrypted test vectors file into said local memory via the transmission bus prior to each test, said test vectors file being loaded unchanged from the storage means to the local memory;

means for decrypting the encrypted data of the test vectors file which is in the local memory and outputting a corresponding decrypted test vectors file; and means for performing the test with the decrypted test vectors file outputted by the decrypting means.

8. An apparatus for securing a file of test vectors utilized in an electronic component test machine having (i) a central processing unit with a storage memory storing an encrypted file of test vectors, (ii) a local memory coupled to the storage memory, and (iii) a component test unit coupled to an output of the local memory for performing a component test, the apparatus comprising:

a decrypting device;

a communications bus coupling the storage memory to the local memory and coupling the decrypting device to the local memory; and a security interface controlling communication on the bus between the decrypting device and the local memory to enable decryption of an encrypted file of test vectors previously loaded into the local memory from the storage memory and then storing the resulting unencrypted file in the local memory, and for blocking access to the local memory by the central processing unit while said local memory contains an unencrypted file of test vectors.

\* \* \* \* \*